(12) United States Patent
Sugiyama et al.

(10) Patent No.: US 6,827,098 B2
(45) Date of Patent: Dec. 7, 2004

(54) FUEL CUT-OFF APPARATUS FOR FUEL TANK

(75) Inventors: Harumitsu Sugiyama, Kanagawa (JP); Morihiko Kishi, Kanagawa (JP); Shinichi Matsuo, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 10/420,835

(22) Filed: Apr. 23, 2003

(65) Prior Publication Data

US 2004/0003843 A1 Jan. 8, 2004

(30) Foreign Application Priority Data

Apr. 25, 2002 (JP) .................................... P. 2002-124572

(51) Int. Cl.[7] .............................................. F16K 24/04
(52) U.S. Cl. .......................................... 137/202; 137/43
(58) Field of Search ................................. 137/43, 202

(56) References Cited

U.S. PATENT DOCUMENTS

| | | |
|---|---|---|
| 4,982,757 A | 1/1991 | Ohasi et al. |
| 5,277,217 A * | 1/1994 | Kobayashi et al. ......... 137/202 |
| 5,832,950 A | 11/1998 | Shimada et al. |
| 6,240,950 B1 * | 6/2001 | Harris ....................... 137/202 |
| 6,591,855 B2 * | 7/2003 | Nishi et al. ................ 137/202 |

FOREIGN PATENT DOCUMENTS

| | | |
|---|---|---|
| JP | 2-112658 | 4/1990 |
| JP | 9-79405 | 3/1997 |

* cited by examiner

Primary Examiner—Gerald A. Michalsky
(74) Attorney, Agent, or Firm—McGinn & Gibb, PLLC

(57) ABSTRACT

The first seal seat is disposed in a first passage of a case. The first float valve body is disposed in the case and closes the first seal seat in response to the liquid level of the fuel. The second seal seat is disposed vertically above the first seal seat, in a second passage of the case. The second valve body is disposed on one side of the second seal seat communicating to the outside of the second passage, with being resiliently urged upwards from below. The second float is disposed in the case and regulates an upper end position of the second valve body to open the second valve seat in response to movement of the liquid level of fuel at least until the liquid level is higher than the liquid level at which the first float valve body closes the first seal seat.

21 Claims, 15 Drawing Sheets

FUEL CUT-OFF APPARATUS FOR FUEL TANK

The present disclosure relates to the subject matter contained in Japanese Patent Application No.2002-124572 filed on Apr. 25, 2002, which is incorporated herein by reference in its entirety.

BACKGROUND OF THE INVENTION

1. Field of the Invention

The present invention relates to a fuel cut-off apparatus disposed on a passage for communicating the inside of a fuel tank with the outside thereof, and shutting off the passage when the liquid level of fuel rises within the fuel tank, for example, during the refilling.

2. Description of the Related Art

A fuel tank for the vehicle is provided with a fuel cut-off apparatus, which allows the gas in the fuel tank to escape to the outside thereof during the refilling so that it becomes possible to refill, and automatically shuts off the passage to tightly close the fuel tank and to stop the refilling when the fuel is filled up to rise the liquid level. Also, the fuel cut-off apparatus is provided on a passage for passing the fuel evaporated within the fuel tank into a canister.

U.S. Pat. No. 4,982,757 (corresponding to JP-A-2-112658) and U.S. Pat. No. 5,832,950 (corresponding to JP-A-9-79405) disclose such fuel cut-off apparatus. However, with the fuel cut-off apparatus according to the related publications, when the liquid level of fuel falls, the buoyancy of float is not exerted so that a valve thereof is opened by the own weight of the float. Therefore, it is not possible to resolve sticking of valves unless the volume of float is increased, resulting in a problem that the fuel shut-off apparatus can not be made compact.

Also, with the fuel cut-off apparatus according to the related publications, when the liquid level of fuel reaches a predetermined height during the refilling, all the valves are cut off, and the tank is fully closed at this time, resulting in a problem that additional refilling is not allowed after automatic stop of a feed oil gun.

SUMMARY OF THE INVENTION

It is an object of the present invention to provide a fuel cut-off apparatus for fuel tank, which securely prevents sticking of valves when the liquid level of fuel falls and allows for additional refilling after automatic stop of the feed oil gun.

In order to accomplish the above object, according to a first aspect of the invention, a fuel cut-off apparatus for a fuel tank, is disposed in a passage for communicating inside of the fuel tank to outside thereof and shutting off the passage when the liquid level of fuel within the fuel tank rises. The fuel cut-off apparatus includes a case, a first seal seat, a first float valve body, a second seal seat, a second valve body, and a second float. The case is attached to a wall portion of the fuel tank and having a first passage and a second passage for communicating the inside of the fuel tank to the outside thereof. The first seal seat is disposed in the first passage of the case. The first float valve body is disposed in the case and closes the first seal seat in response to the liquid level of the fuel when the liquid level rises. The second seal seat is disposed vertically above the first seal seat, in the second passage of the case. The second valve body is disposed on one side of the second seal seat communicating to the outside of the second passage, and is resiliently urged upwards from below. The second float is disposed in the case and regulates an upper end position of the second valve body to open the second valve seat in response to movement of the liquid level of fuel at least until the liquid level is higher than the liquid level at which the first float valve body closes the first seal seat. The second valve body closes the second seal seat when the second float does not regulate the upper end position of the second valve body.

With the first aspect, if the liquid level of fuel within the fuel tank reaches a certain height, the first float valve body makes contact with the first seal seat to close the first passage, so that the internal pressure of the fuel tank is increased to automatically stop a feed oil gun. However, at this time, the second valve body is still opened with an upper end position regulated by the second float, so that there remains a narrow passage for allowing the gas within the fuel tank to escape to the outside. As a result, the additional oiling is enabled by operating the feed oil gun. If the liquid level of fuel further rises, the second float rises and the second valve body closes the second seal seat, so that the fuel tank is fully closed to disable the additional oiling and the refueling is completed.

Then, if the liquid level of fuel falls, the second float firstly falls to press down the upper end of the second valve body and open the second seal seat. At this time, when the internal pressure of the fuel tank is high, the conventional device has a force exerted in a direction for closing the valve. However, in the first aspect, the internal pressure of the fuel tank is exerted in a direction for opening the second valve body, because the second valve body is disposed on the side of the second seal seat communicating to the outside of the second passage. As a result, the second valve body is rapidly opened without sticking to the second valve body. If the liquid level of fuel further falls, the first valve body is opened this time, so that the first passage communicates to the outside. At this time, the second valve body is already opened, so that the internal pressure of the fuel tank and the outside pressure are in equilibrium, whereby the first valve body does not stick to the first valve seat.

According to a second aspect of the invention, in the first aspect, the second passage is connected to the first passage at a position vertically below the second seal seat.

With the second aspect, even if the fuel enters the second passage in a state where the second valve body closes the second seal seat, and accumulates over the second seal seat closed by the second valve body, the fuel flows through the second seal seat downwards to enter a first communication passage to return to the fuel tank, when the second valve body is opened. As a result, the accumulated fuel is surely prevented from being derived to the outside.

According to a third aspect of the invention, in the first or second aspects, the second float includes a second float main body rising as the liquid level of the fuel rises, an overhang portion extending upright from the second float main body and overhanging above the second valve body, and a second valve body pressing portion extending from the overhang portion to be close to the second float main body and abutting against the second valve body to press down the second valve body.

With the third aspect, the second valve body resiliently urged upwards from below toward the second seal seat is pressed down by the second valve body pressing portion of the second float main body, when the liquid level of fuel within the fuel tank is low. The second valve body pressing portion has no regulation to cause the second valve body to contact with the second seal seat due to its resilient urging force, and close the second passage, when the liquid level of fuel within the fuel tank rises to cause the second float to rise.

According to a fourth aspect of the invention, in the third aspect, the case includes a cylindrical case main body receiving the first float valve body and the second float main body, and forming the first passage, and an upper body assembled on an upper portion of the case main body to derive the first passage to the outside thereof and forming the second passage between the upper body and the case main body. The overhang portion extends into the second passage through an opening defined at an upper wall of the case main body.

With the fourth aspect, since the second passage is formed between the case main body and the upper body, and the overhang portion is introduced into the second passage side, the second valve body disposed on the side of the second seal seat communicating to the outside of the second passage and resiliently urged upwards from below is pressed down by the second valve body pressing portion.

According to a fifth aspect of the invention, in the third or fourth aspects, the valve body pressing portion of the second float has a plurality of ribs projecting from an axial center in outer diameter directions to form a vent path between the ribs. Lower end faces of the ribs have concave shapes to position the second valve body. At least one of opposed faces of the second float main body and the first float is partially formed a convex portion for preventing the intimate contact of the first float and the second float main body.

With the fifth aspect, since the valve body pressing portion has the plurality of ribs projection from the axial center in the outer diameter direction to form the vent path between the ribs, the second passage is not closed by the valve body pressing portion. Also, since the lower end face of the valve body pressing portion is concave to position the second valve body, the second valve body is always contacted with the second seal seat at proper position without preventing the second valve body from being eccentric. Moreover, since either one of the opposed faces between the second float main body and the first float is partially formed with the convex portion for preventing the intimate contact of both, it is possible to prevent the second float main body and the first float from being contacted and moved together to disable the up and down operation to be made independently.

According to a sixth aspect of the invention, in any one of the first to fifth aspects, the first seal seat is formed on a partition wall disposed in the case main body. The second valve body and a resilient urging member for urging the second valve body upward from below are sandwiched between the partition wall and an inner wall of the case main body to define the second passage.

With the sixth aspect, since the partition wall is provided, the first seal seat is formed and the second passage is demarcated, whereby the second valve body and its urging means are easily installed.

According to a seventh aspect of the invention, in any one of the first to sixth aspects, the first float valve body includes a first float main body, a cap portion assembled via a gap on an upper portion of the first float main body, and a first valve body fitted to an opening portion defined in the cap portion.

With the seventh aspect, since the first float valve body includes the first float main body and the cap portion, the cap portion is provided with an opening portion for fitting the first valve body to occupy as large a volume of the first float valve body as possible. Also, since the first valve body is fitted into the opening portion of the cap portion, it is possible to prevent the first valve body from being out of place, even if the first valve body made of rubber is swollen by the fuel.

According to an eighth aspect of the invention, in the seventh aspect, the gap between the first float main body and the cap portion of the first float valve body communicates to a space defined in the case main body.

With the eighth aspect, even if the fuel enters into the gap between the first float main body and the cap portion, the fuel is rapidly flowed back into the space within the case main body, and then into the fuel tank, whereby it is possible to prevent the fuel from remaining in the gap and flowing outside.

According to a ninth aspect of the invention, in any one of the first to eighth aspects, the case main body has one internal space having one of approximately columnar shape and approximately prismatic shape. The first float valve body and the second float complement each other to have a shape adaptable to the one internal space.

According to the ninth aspect, the entire device is made compact while the volume of the first float valve body and the second float is made as large as possible.

According to a tenth aspect of the invention, in the ninth aspect, the overhang portion of the second float has a plurality of leg portions. The leg portions are inserted through a plurality of corresponding openings defined on an upper wall of the case main body into the case main body and connected to the second float main body.

With the tenth aspect, since the overhang portion of the second float has the plurality of leg portions, which are inserted through the plurality of openings provided on the upper wall of the case main body and linked to the second float main body, the up and down operation of the second float is guided by the leg portions inserted into the opening to be regulated in rotation. Consequently, the first float valve body having a shape complementary with the second float within the case main body is also regulated in rotation, and thereby correctly contacted with the first seal seat without providing any guide for the first float valve body.

BRIEF DESCRIPTION OF THE DRAWINGS

FIG. 3 shows a case main body of a case in the fuel cut-off apparatus, in which

FIG. 4 shows a partition wall of the case in the fuel cut-off apparatus, in which

FIG. 5 shows a cap portion of a first float valve body in the fuel cut-off apparatus, in which

FIG. 6 shows a first float main body of the first float valve body in the fuel cut-off apparatus, in which

FIG. 7 shows a first valve body of the first float valve body in the fuel cut-off apparatus, in which

FIG. 8 shows a bottom plate of the case in the fuel cut-off apparatus, in which

FIG. 9 shows an overhang portion of a second float in the fuel cut-off apparatus, in which

FIG. 10 shows a second float main body of a second float in the fuel cut-off apparatus, in which

FIG. 11 shows an upper body of the case in the fuel cut-off apparatus, in which

DETAILED DESCRIPTION OF THE PREFERRED EMBODIMENT

One embodiment of the present invention will be described below with reference to the accompanying drawings.

Figure 1:
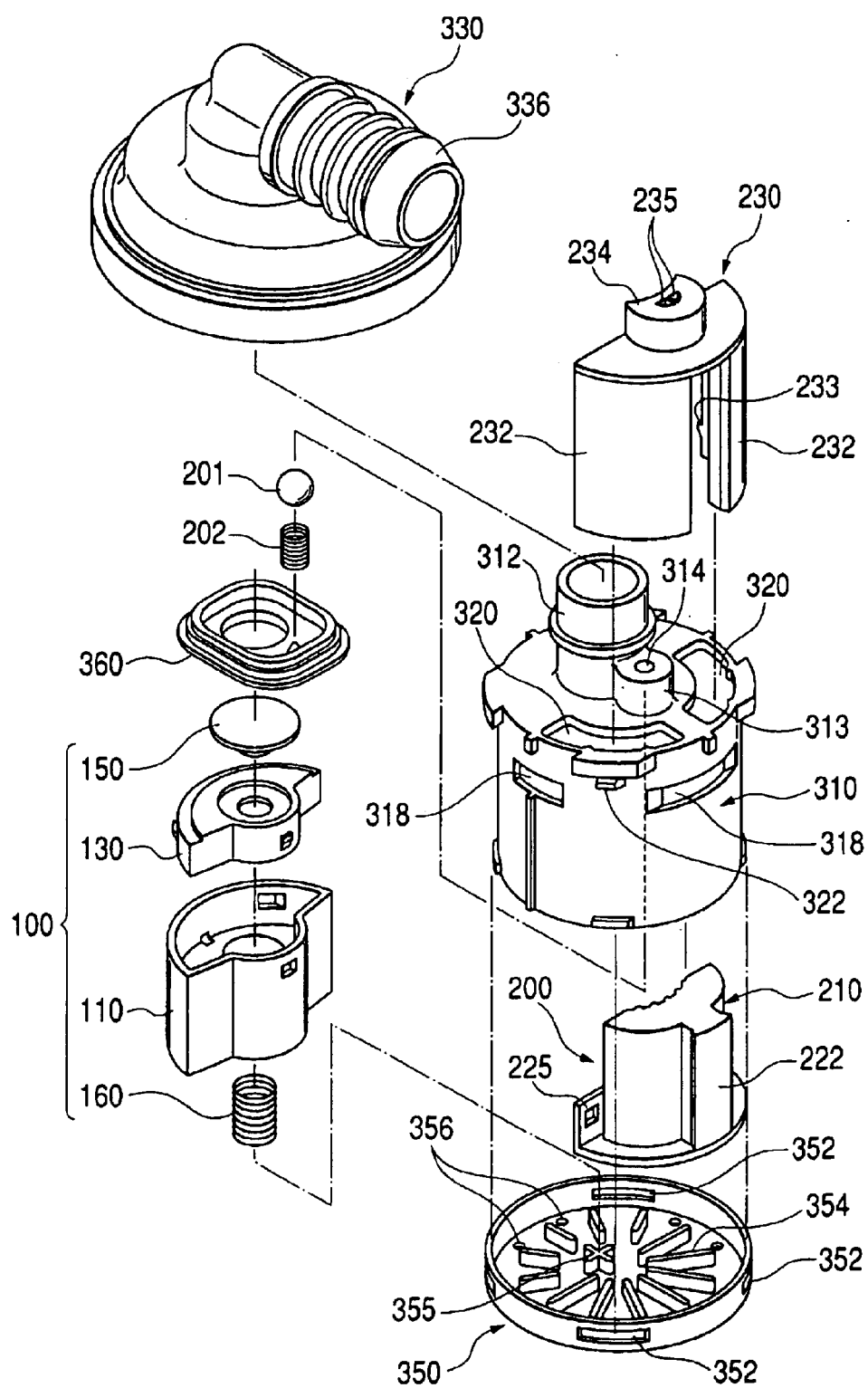
FIG. 1 is an exploded perspective view of a fuel cut-off apparatus for a fuel tank according to the present invention.
Figure 2:
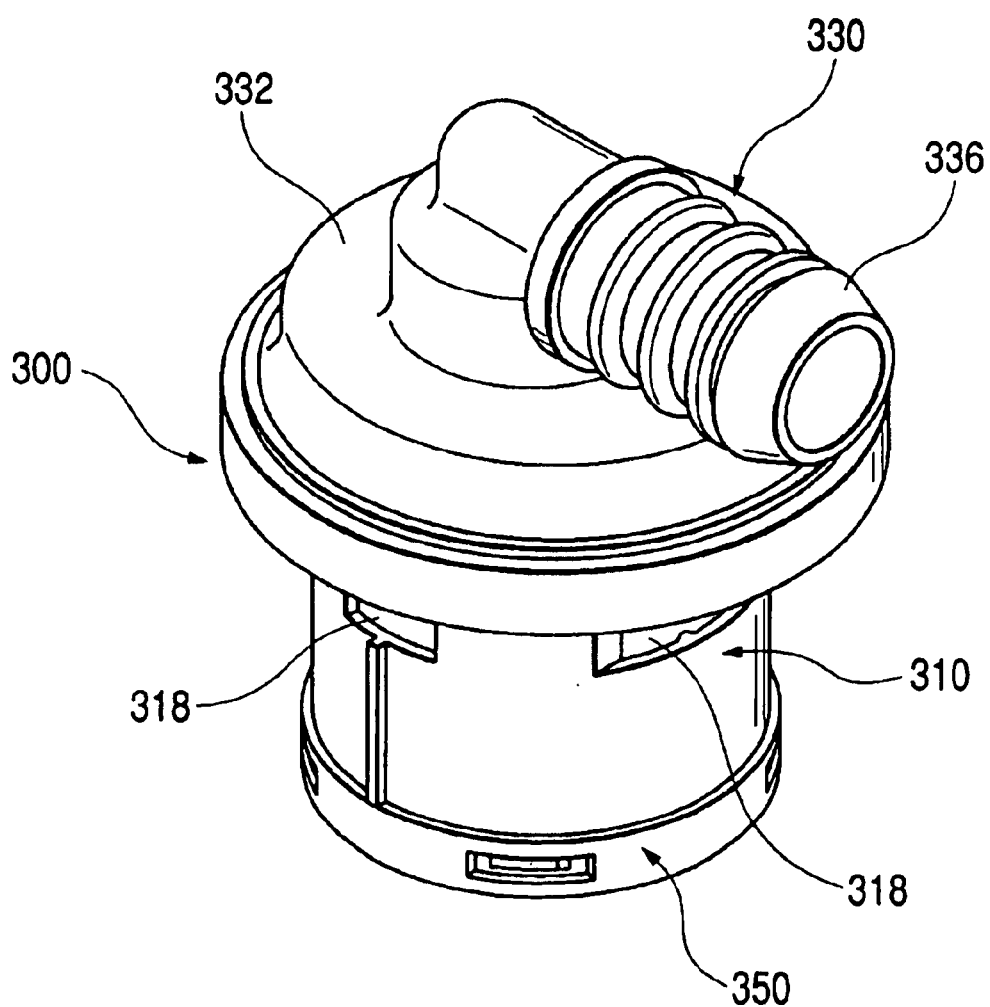
FIG. 2 is a perspective view of the fuel cut-off apparatus.
Figure 3A:
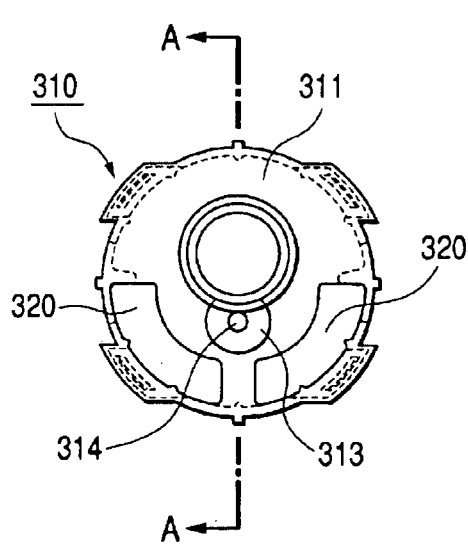
FIG. 3A is a plan view.
Figure 3C:
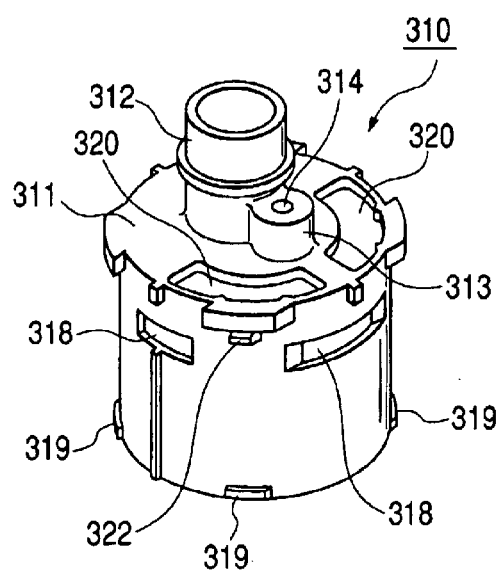
FIG. 3C is a perspective view.
Figure 3B:
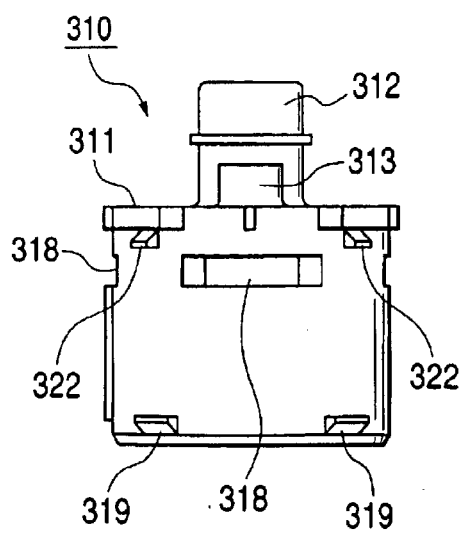
FIG. 3B is a front view.
Figure 3D:
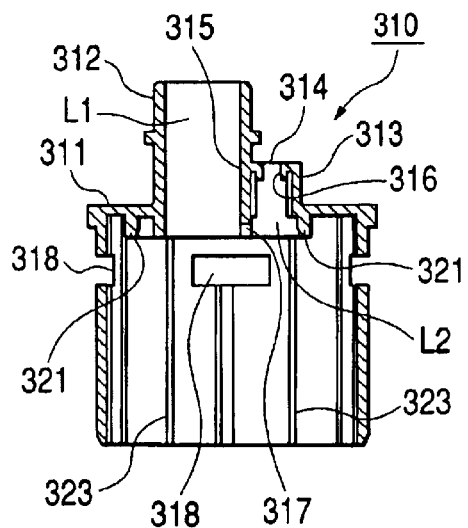
FIG. 3D is a cross-sectional view taken along the line A—A in FIG. 3A.

As shown in FIGS. 1 and 2, a fuel cut-off apparatus for a fuel tank includes a first float valve body 100, and a second valve body 201 that is opened or closed by a second float 200, in which all these components are contained in a case 300.

The case 300 includes a case main body 310, an upper body 330 assembled on an upper portion of the case main body 310, a bottom plate 350 assembled on a lower face of the case main body 310, and a partition wall 360 disposed within the case main body 310.

The first float valve body 100 includes a first float main body 110, a cap portion 130 covered on an upper portion of the first float main body 110, a first valve body 150 attached to the cap portion 130, and a spring 160 that is a resilient member for upwardly urging the first float valve body 100.

The second float 200 includes a second float main body 210, and an overhang portion 230 connected to the second float main body 210 and extending upwards. Also, the second valve body 201 is formed of a ball valve. A spring 202, which is a resilient member, for upwardly urging the second valve body 201 is provided.

The above members are assembled with an arrangement as indicated by the dashed line in FIG. 1 to constitute a fuel cut-off apparatus according to the embodiment of the invention. The structure of each member will be described below in detail.

As shown in FIG. 3, the case main body 310 is almost cylindrical as a whole, and an upper wall 311 closes the upper face thereof and a lower face thereof is opened. The upper wall 311 has a protruding pipe portion 312 making up a first passage L1. A bulge portion 313 is provided adjacent to the pipe portion 312, and an upper face of this bulge portion 313 is formed with an opening 314.

A partition wall 315 demarcating the first passage L1 of the pipe portion 312 is provided inside the bulge portion 313, and an inner peripheral part of the opening 314 forms a second seal seat 316. The interior of this bulge portion 313 forms a second passage L2, within which the second valve body 201 and the spring 202 are contained. At a lower end of the partition wall 315, a notch 317 is provided to form a communication passage to the first passage L1.

On an upper peripheral face of the case main body 310, a plurality of openings 318 for letting in or out the gas within the fuel tank and a plurality of pawls 322 to which the upper body 330 is fitted are formed. On a lower peripheral face thereof, a plurality of pawls 319 to which the bottom plate 350 is fitted are formed.

Also, a plurality of ribs 323 extending vertically are formed around the inner circumference of the case main body 310, to prevent the first float valve body 100 and the second float 200 from sticking.

Further, the upper wall 311 is formed with a plurality of openings 320, or two openings in this embodiment, for passing an overhang portion 230 of the second float 200, which will be described later.

Figure 4A:
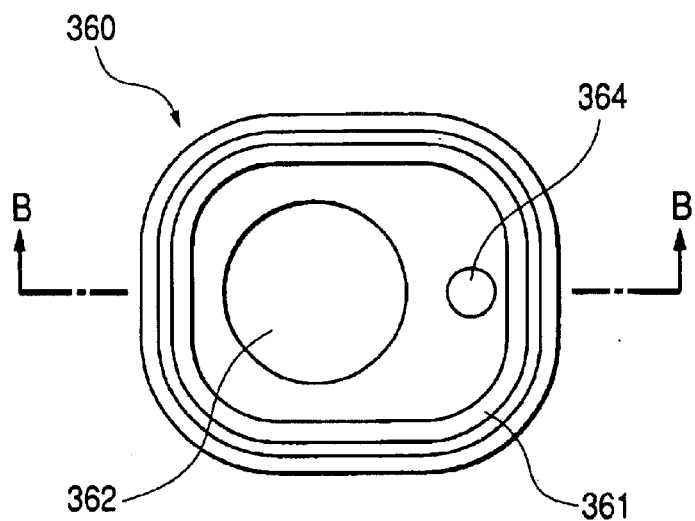
FIG. 4A is a plan view.
Figure 4B:
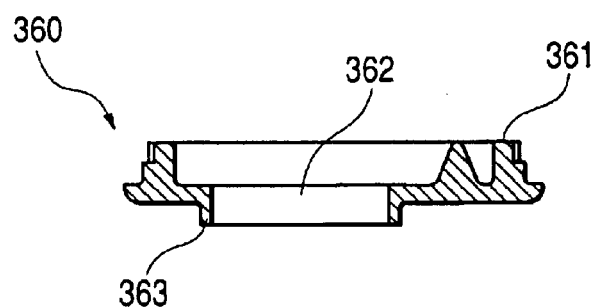
FIG. 4B is a cross-sectional view taken along the line B—B in FIG. 4A.
Figure 4C:
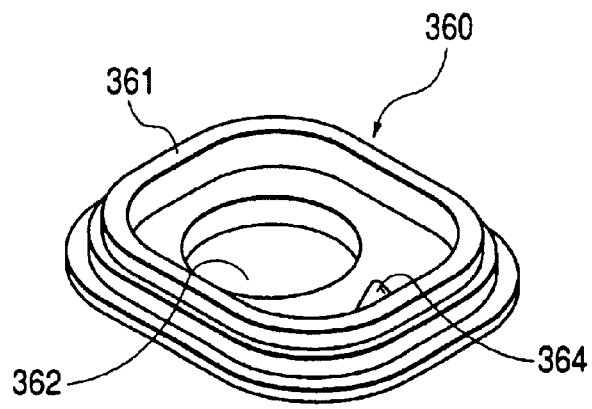
FIG. 4C is a perspective view.

As shown in FIG. 4, a partition wall 360 has a rib 361 fitted with a rib 321 formed on a lower face of the upper wall 311 in the case main body 310, and is attached within the case main body 310 by fitting this rib 316 with the rib 321 in the case main body 310 and welding them together.

Also, the partition wall 360 is formed with an opening 362, its opening edge of the lower face forms a first seal seat 363 like a rib. Moreover, a projection 364 for fitting and holding a lower end of the spring 202 for the second valve body 201 is formed on an upper face of the partition wall 360.

Figure 12:
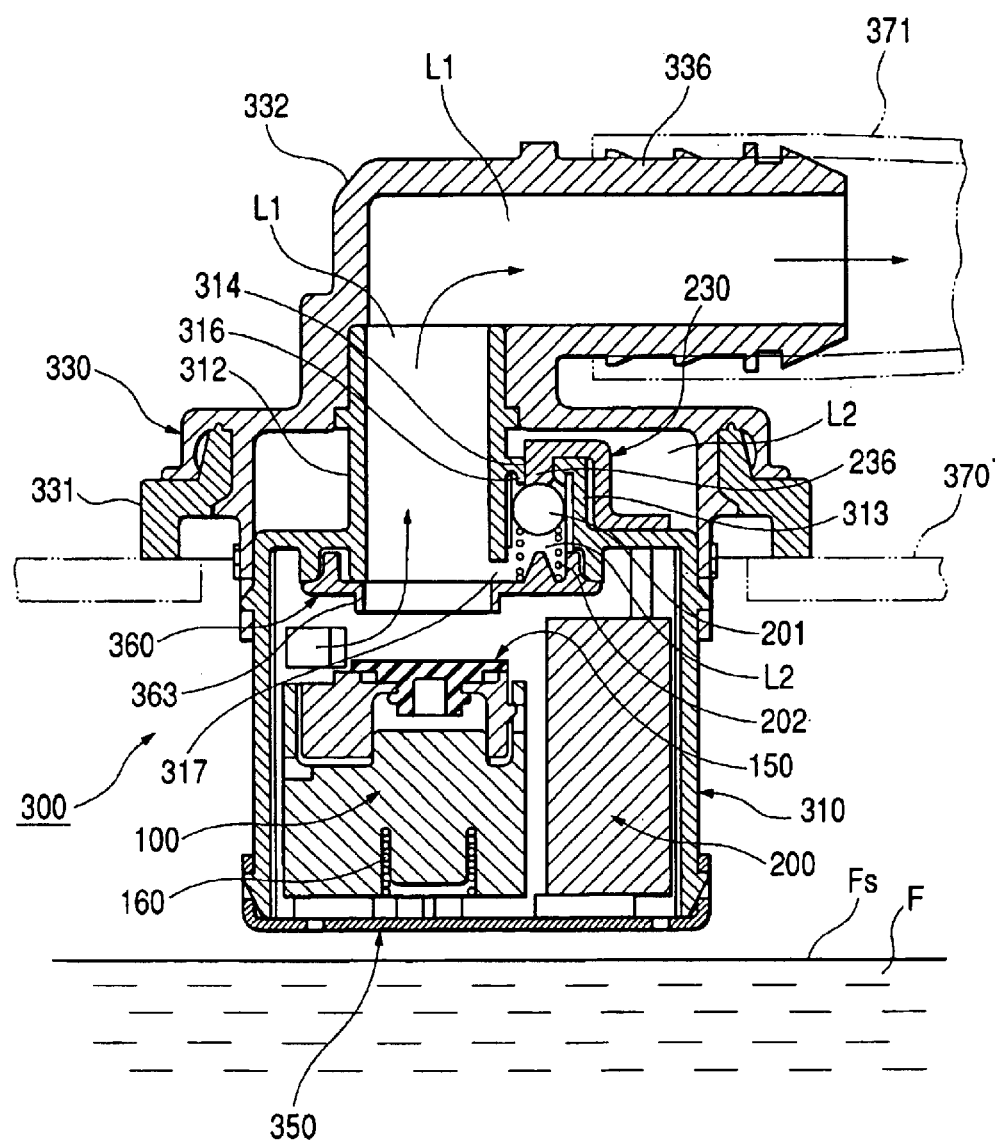
FIG. 12 is a cross-sectional view showing the fuel cut-off apparatus in a state where the liquid level of fuel is low.

Referring to FIG. 12, the partition wall 360 is attached to a lower face of the upper wall 311 in the case main body 310 in the above manner, whereby the opening 362 is aligned with the lower end of the pipe portion 312 to form the first passage L1.

Also, the second valve body 201 and the spring 202 are contained within the bulge portion 313, and carried between the partition wall 360 and the second seal seat 316. The second passage L2 passing through the inside of the bulge portion 313 is communicated through the notch 317 with the first passage L1.

Figure 8A:
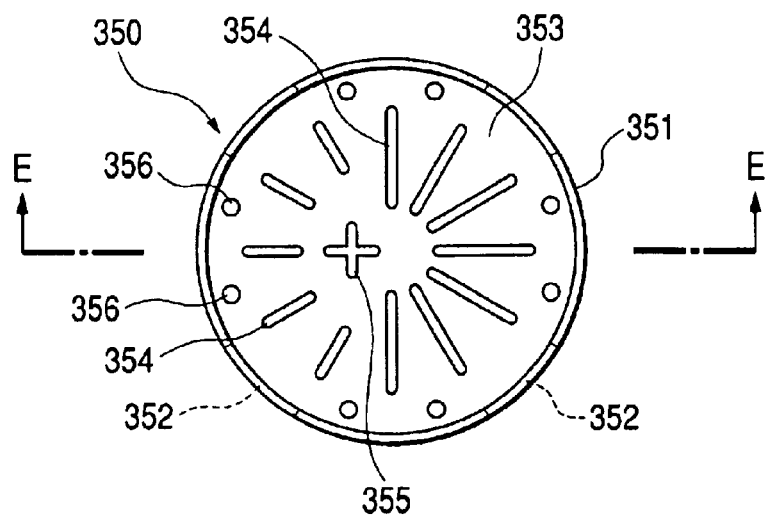
FIG. 8A is a plan view.
Figure 8B:
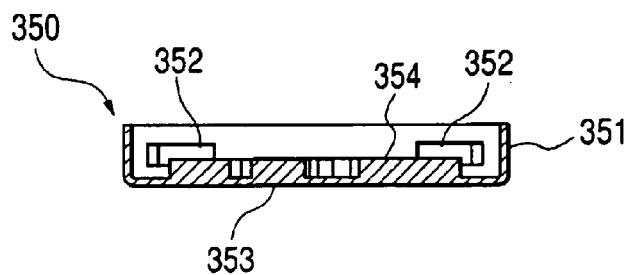
FIG. 8B is a cross-sectional view taken along the line E—E in FIG. 8A.
Figure 8C:
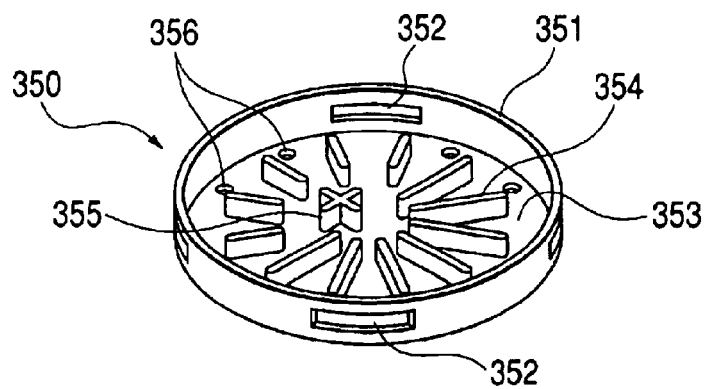
FIG. 8C is a perspective view.
Figure 9A:
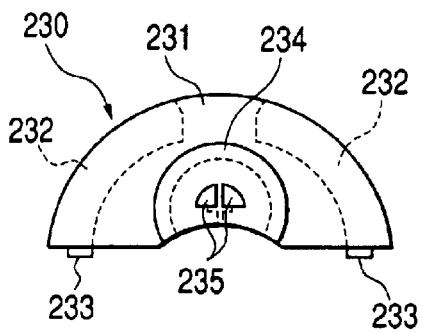
FIG. 9A is a plan view.
Figure 9B:
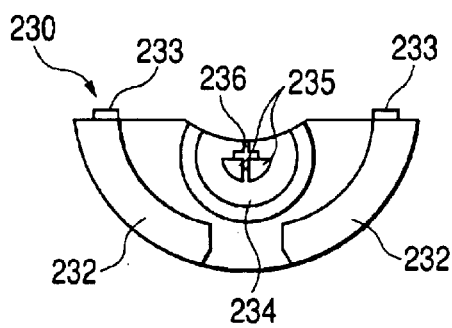
FIG. 9B is a bottom view.
Figure 9C:
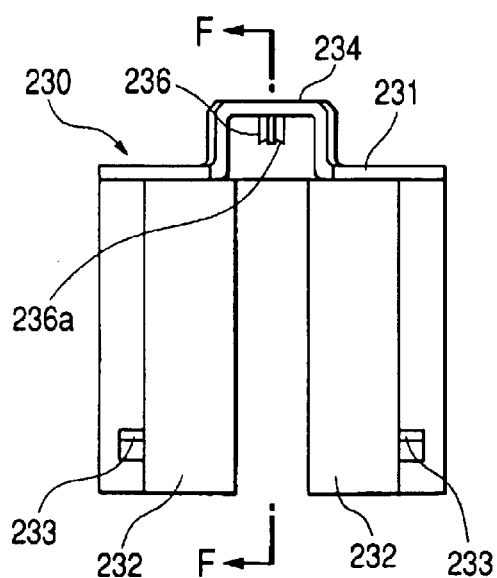
FIG. 9C is a front view.
Figure 9D:
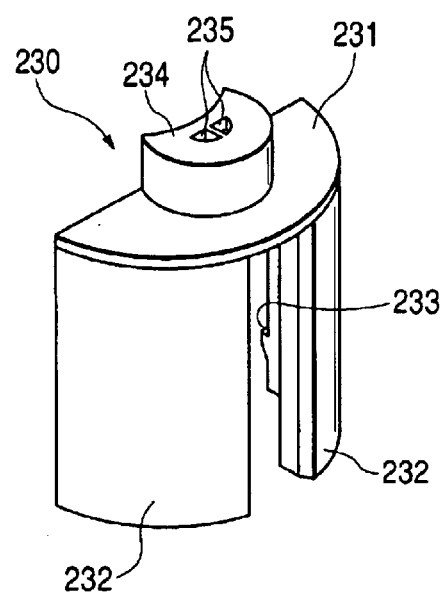
FIG. 9D is a perspective view.
Figure 9E:
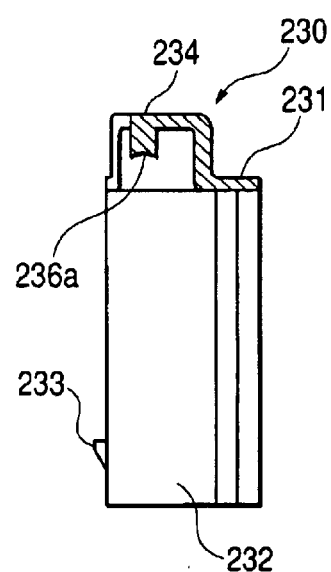
FIG. 9E is a cross-sectional view taken along the line F—F in Fig. 9C.

As shown in FIG. 8, the bottom plate 350 attached on the lower face of the case main body 310 has a lower circumferential wall 351 around the circumferential edge of the disk. The circumferential wall 351 includes the engagement holes 352 engaged with the pawls 319 of the case main body 310.

Also, on a bottom wall 353, there are formed ribs 354 for laying the bottom portion of the first float valve body 100 and the second float 200 without intimately contacting with the bottom wall 353. A boss 355, like a cross in plan view, for fitting a lower end of the spring 160 in the first float valve body 100 is formed at a position slightly offset from the center of the bottom wall 353. Moreover, a plurality of through holes 356 for passing the fuel or gas within the fuel tank are formed on the bottom wall 353.

This bottom plate 350 is attached on the lower face of the case main body 310 by engaging the pawls 319 of the case main body 310 with the engagement holes 352 of the bottom plate 350, as described above.

As shown in FIG. 11, the upper body 330 attached on the upper portion of the case main body 310 includes an annular frame member 331 that is welded with the circumferential edge of the opening portion in the fuel tank, and a main body 332 molded integrally with the frame member 331. The frame member 331 is made of a resin material that can be welded with the fuel tank, for example, olefin resin. The main body 332 is made of a resin material that is excellent in the strength or the property of not transmitting fuel, for example, polyamide resin.

A plurality of tongue pieces 333 are protruded at regular intervals on a lower edge part of the main body 332 in the upper body 330. Each tongue 333 is formed with a hole 334 engaged with each pawl 322 of the case main body 310.

The main body 332 of the upper body 330 is formed with a cylindrical concave portion 335 into which the pipe portion 312 of the case main body 310 is inserted. This concave portion 335 is in communication to a nozzle 336 standing from an upper wall of the main body 332 and extending out transversely. The nozzle 336 has an annular retention rib 337 around the outer circumference.

As shown in FIG. 12, the fuel cut-off apparatus is tightly attached to the fuel tank 370 by welding the frame member 331 of the upper body 330 with the edge part of the opening portion on the upper wall of the fuel tank 370. The first passage L1 passing through the pipe portion 312 of the case main body 310 is derived out through the nozzle 336 of the upper body 330. In this case, a pipe 371 is connected to the nozzle 336 and to the canister, not shown.

Figure 6A:
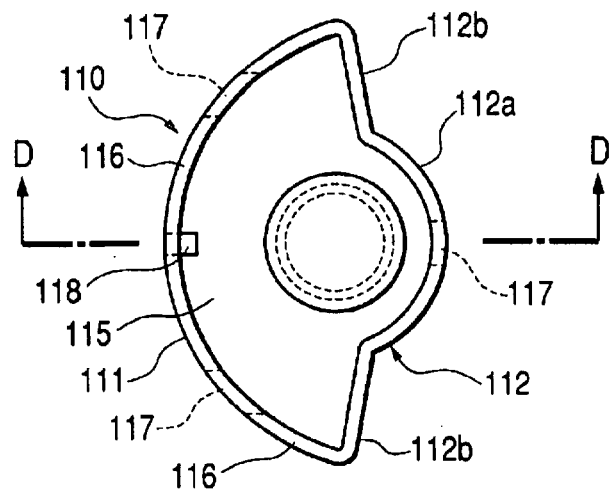
FIG. 6A is a plan view.
Figure 6B:
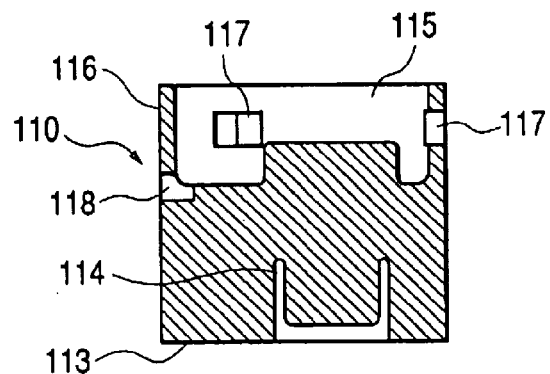
FIG. 6B is a cross-sectional view taken along the line D—D in FIG. 6A.
Figure 6C:
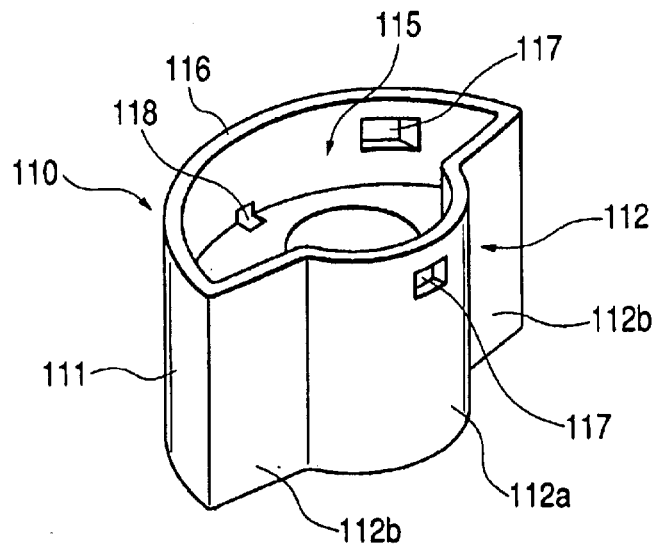
FIG. 6C is a perspective view.

As shown in FIG. 6, the first float main body 110 of the first float valve body 100 has a cylindrical shape in which its outer circumference 111 is adapted to the inner circumference of the case main body 310. In the first float main body 110, a plane 112 opposed to the second float 200 has a central part 112a bulging out cylindrically, and both sides 112b being flat, and has columnar and almost fan-shaped in plan view.

An annular groove 114 for fitting an upper end of the spring 160 is formed on a bottom face 113 of the first float main body 110. Also, a concave portion 115 is formed on an upper face of the first float main body 110, in which its peripheral part forms a rib 116. The rib 116 is formed with a plurality of engagement holes 117 engaged with the engaging pawls 131 of the cap portion 130. Moreover, a loophole 118 is formed to let the fuel remaining within the concave portion 115 to escape.

Figure 5A:
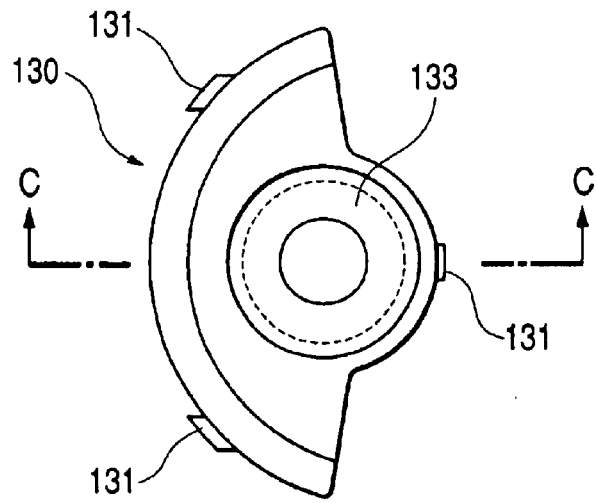
FIG. 5A is a plan view.
Figure 5B:
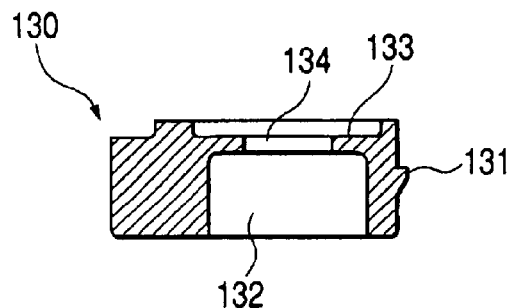
FIG. 5B is a cross-sectional view taken along the line C—C in FIG. 5A.
Figure 5C:
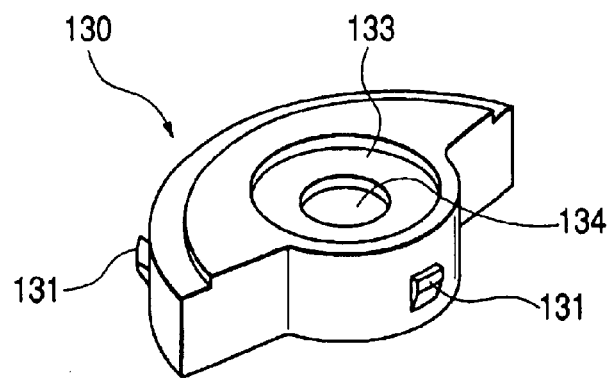
FIG. 5C is a perspective view.

The cap portion 130 assembled on the first float main body 110 has a shape adaptable to the concave portion 115 of the first float main body 110. In the cap portion 130, a plurality of engaging pawls 131 engaging with the engagement holes 117 of the rib 116 are formed on outer circumference thereof, as shown in FIG. 5.

A concave portion 132 is formed on a lower face of the cap portion 130, and an installing portion 133 having a shallow concave portion to install the first valve body 110 is provided on an upper face thereof. At the center of the installing portion 133, an opening 134 for fitting the first valve body 150 is formed.

Figure 7A:
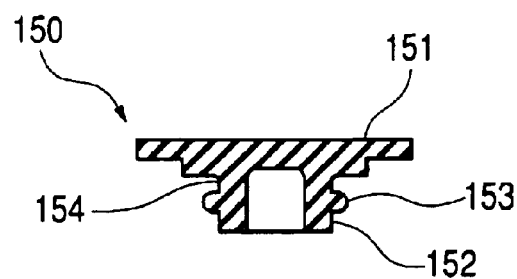
FIG. 7A is a cross-sectional view.
Figure 7B:
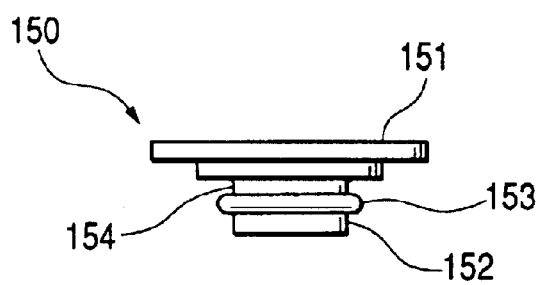
FIG. 7B is a front view.
Figure 7C:
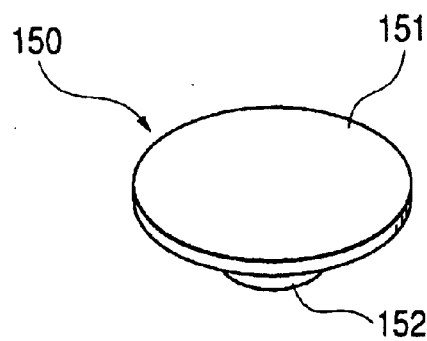
FIG. 7C is a perspective view.

As shown in FIG. 7, the first valve body 150 includes a disc portion 151, a cylindrical portion 152, an annular rib 153, and an annular groove 154. The disc portion 151 has the size to cover the opening 134. The cylindrical portion 152 protrudes from the central part of a lower face of the disc portion 151. The annular rib 153 is formed around the outer circumference of the cylindrical portion 152. The annular groove 154 is formed between the annular rib 153 and the disc portion 151.

The first valve body 150 is made of synthetic rubber that is oil resistant, and is fitted in the installing portion 133 of the cap portion 130 in such away that the cylindrical portion 152 is pressed into the opening 134 of the cap portion 130 and the marginal part of the opening portion 134 is fitted into the annular groove 154.

The first float valve body 100 assembled in this manner is contained within the case main body 310, and upwardly urged by the spring 160 interposed in the bottom plate 350, as shown in FIG. 12. However, when the first float valve body 100 is not submerged in the fuel, the first float valve body 100 lowers. Because the own weight of the first float valve body 100 surpasses an urging force of the spring 160.

If the liquid level of fuel rises, the first float valve body 100 is submerged in the fuel to cause the buoyancy, and gradually rises due to an urging force of the spring 160. This is because the buoyancy gradually offsets the own weight. Then, if the liquid level of fuel is higher than a predetermined value, the first valve body 150 is intimately contacted with the first seal seat 363 to close the opening portion 362 of the partition wall 360.

Figure 10A:
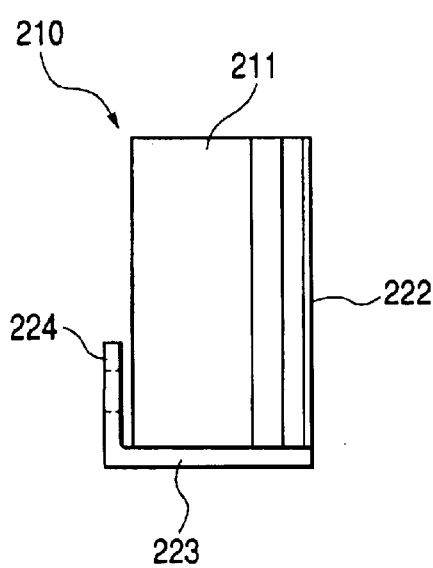
FIG. 10A is a front view.
Figure 10B:
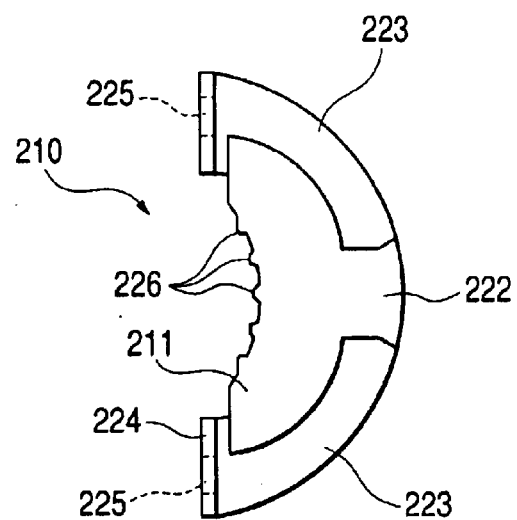
FIG. 10B is a plan view.
Figure 10C:
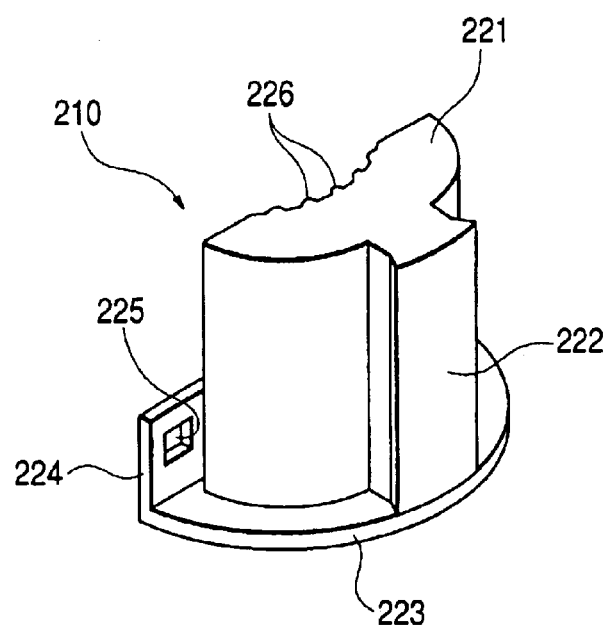
FIG. 10C is a perspective view.
Figure 11A:
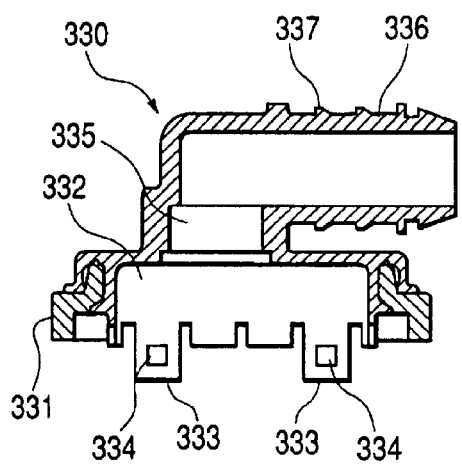
FIG. 11A is a front cross-sectional view.
Figure 11C:
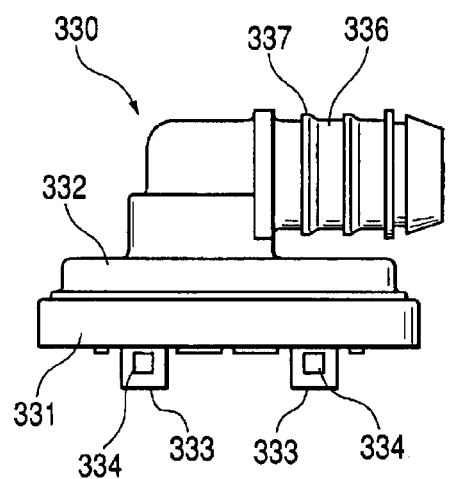
FIG. 11C is a front view.
Figure 11B:
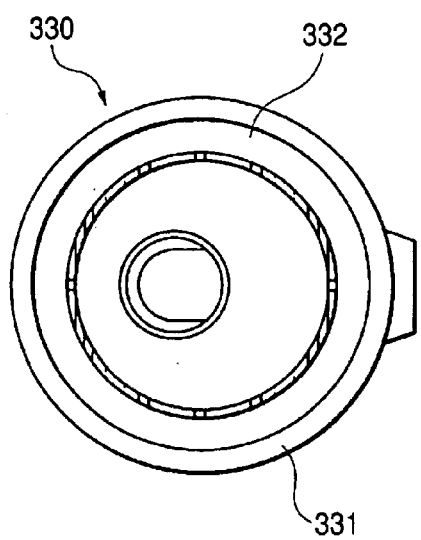
FIG. 11B is a plan view.
Figure 11D:
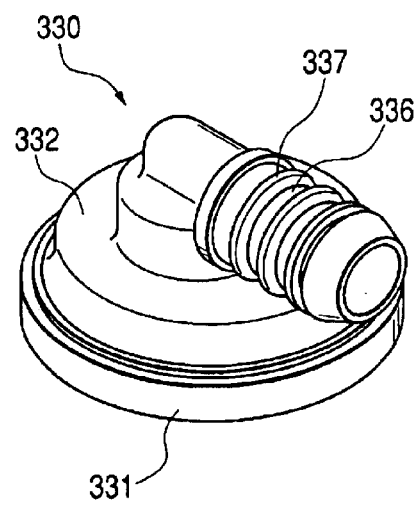
FIG. 11D is a perspective view.

As shown in FIG. 10, the second float main body 210 of the second float 200 includes a columnar portion 211, a protrusion portion 212, a flange 223, and a rib 224. The columnar portion 211 has an outer diameter slightly smaller than the inner diameter of the case main body 310 and has a fan shape in plan view. The protrusion portion 222 protrudes from the central part of the outer circumference of the columnar portion 211 to the outer diameter side. The flange 223 continues from the lower face thereof. The rib 224 stands from a portion of the flange 223 opposed to the first float valve body 100. The rib 224 is formed with an engagement hole 225 that is engaged with the overhang portion 230. Moreover, a plurality of rib-like convex portions 226 for preventing sticking to the first float valve body 100 are axially formed in parallel on a face of the columnar portion 211 opposed to the first float valve body 100.

As shown in FIG. 9, the overhang portion 230 includes an upper plate 231 having a fan shape in plan view and two leg portions 232 formed on a lower surface of the upper plate 231. The two leg portions 232 has a circular shape in cross section and are parallel to each other to have a gap therebetween. The pawls 233 engaging with the engagement holes 225 of the second float main body 210 are formed on the end sides in a direction where the leg portions 232 are far away from each other. The leg portions 232 are inserted into the openings 320 of the case main body 310.

Also, a cylindrical wall 234 having a circular shape partially cut away is formed integrally in the central part of the upper face of the upper plate 231. The vent holes 235 are formed on the top face of this cylindrical wall 234. Moreover, a second valve body pressing portion 236 extending downwards in a cruciform in cross section from a part other than the vent holes 235 is formed under the top face of the cylindrical wall 234.

This second valve body pressing portion 236 is inserted from the above into the opening 314 of the bulge portion 313 in the case main body 310. At this time, the gap in the cruciate rib of the second valve body pressing portion 236 serves to communicate the inside and the outside of the cylindrical wall 234 without closing the opening 314 of the second seal seat 316.

Also, a lower face 236a of the second valve body pressing portion 236 is of circular arc to hold the second valve body 201 consisting of a ball valve. The second valve body 201 contacts with the circular lower face of the second valve body pressing portion 236 and is disposed without deviation while being always regulated toward the center.

The overhang portion 230 is connected to the second float main body 210 with sandwiching the upper wall of the case main body 310 in the following manner. The leg portions 232 are inserted into the openings 320 of the case main body 310. Furthermore, the overhang portion 230 is contacted with the outer periphery of the columnar portion 211 of the second float main body 210 while the protrusion portion 222 is disposed between the pair of leg portions 232. Then the pawls 233 are engaged with the engagement holes 225 of the second float main body 210.

In this state, the second float 200 can slide vertically by a predetermined distance with respect to the case main body 310. The second valve body pressing portion 236 is inserted into the opening 314 of the second seal seat 316, and extended downwards. The circular lower face 236a contacts the second valve body 201 to regulate the upper end position of the second valve body 201.

The first float valve body 100 and the second float 200 complement each other to form a columnar shape as a whole and are adapted to the inner circumferential shape of the case main body 310 to have as large a volume as possible, generating a great buoyancy, although being compact as a whole.

The two leg portions 232 of the overhang portion 230 of the second float 200 are inserted into two openings 320 of the case main body 310, so that the second float 200 is prevented from rotating and the first float valve body 100 having a complementary shape to the second float 200 is also prevented from rotating. Accordingly, each valve body 150, 201 is prevented from being displaced with respect to the corresponding seal seat 363, 316.

Next, the operation of the fuel cut-off apparatus for the fuel tank will be described below.

FIG. 12 shows a state where the case 300 does not contact the liquid level Fs of fuel F. The first float valve body 100 and the second float valve body 200 are positioned at the bottom end vertically slidably due to their own weights against the urging forces of the springs 160 and 202.

As a result, the first valve body 150 of the first float valve body 100 is left away from the first seal seat 363, so that the opening 362 of the first seal seat 363 is opened. Also, the second valve body pressing portion 236 of the second float 200 presses the second valve body 201 downwards, so that the opening 314 of the second seal seat 316 is opened.

Accordingly, the first passage L1 and the second passage L2 are in communication with the outside to enable the fuel to be fed through an oil filler port. That is, if the fuel is fed into the fuel tank 370, the air within the fuel tank 370 is passed through the first passage L1 and the second passage L2 to the outside to enable the fuel to be fed into the fuel tank 370.

Figure 13:
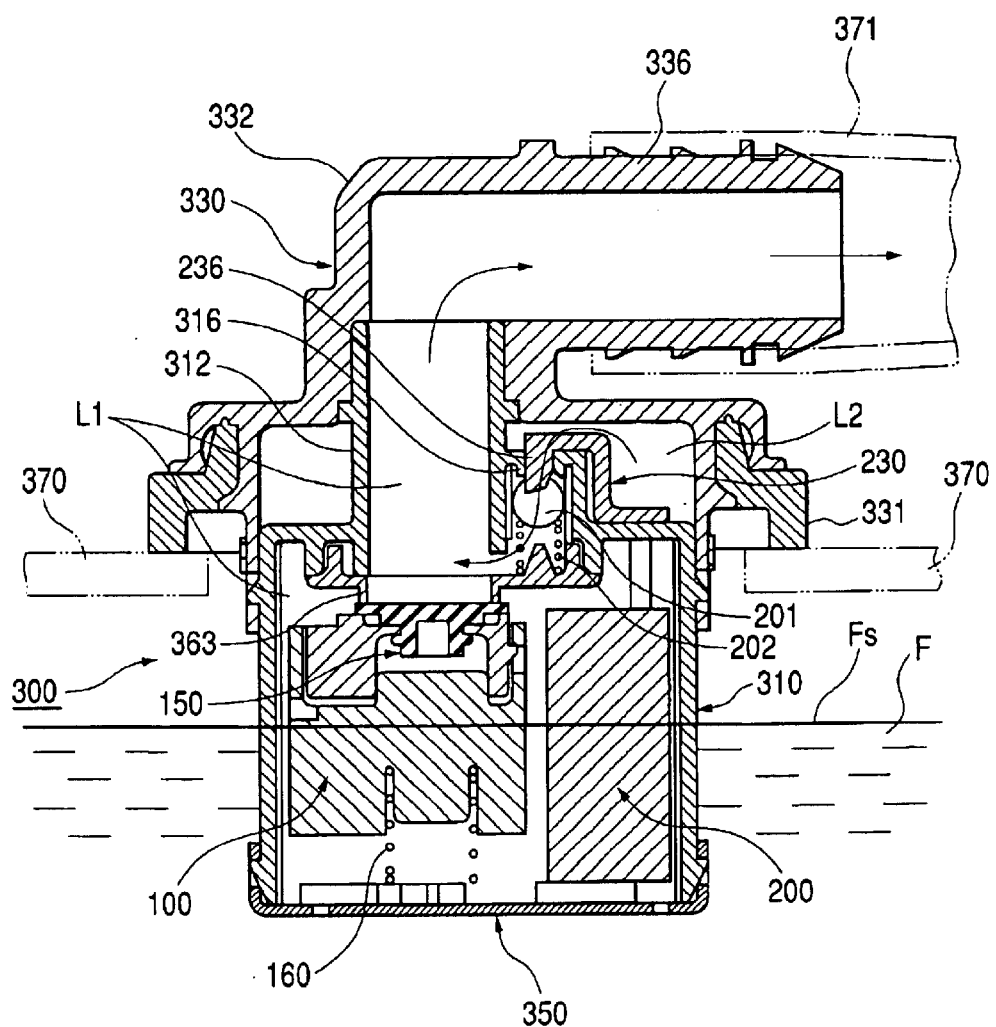
FIG. 13 is a cross-sectional view showing the fuel cut-off apparatus in a state where the liquid level of fuel rises to close a first passage.

FIG. 13 shows a state where the liquid level Fs of fuel F rises by oiling so that the first float valve body 100 floats. In this state, the first valve body 150 of the first float valve body 100 intimately contacts with the first seal seat 363 to close the opening 362 of the first seal seat 363. However, the second float main body 200 does not still float up to the upper limit, whereby the second valve body 201 is pressed down by the second valve body pressing portion 236 of the overhang portion 230. The opening 314 of the second seal seat 316 is opened.

Therefore, the first passage L1 having a large width and a small vent resistance is closed, while the second passage L2 having a small width and a great vent resistance is communicated to the outside. In this state, the rising speed of the liquid level Fs of fuel F is not followed by the discharge flow rate of gas within the fuel tank 370, so that the air pressure of the fuel tank 370 is increased to automatically stop the feed oil gun. Thus, the operator takes the feed oil gun to perform additional oiling manually, while peeping into the liquid level of fuel from the oil filler port. The feed oil rate at this time is very slower than that by the feed oil gun. Therefore, it becomes possible to feed oil with exhaust through the second passage L2 having the smaller width.

Figure 14:
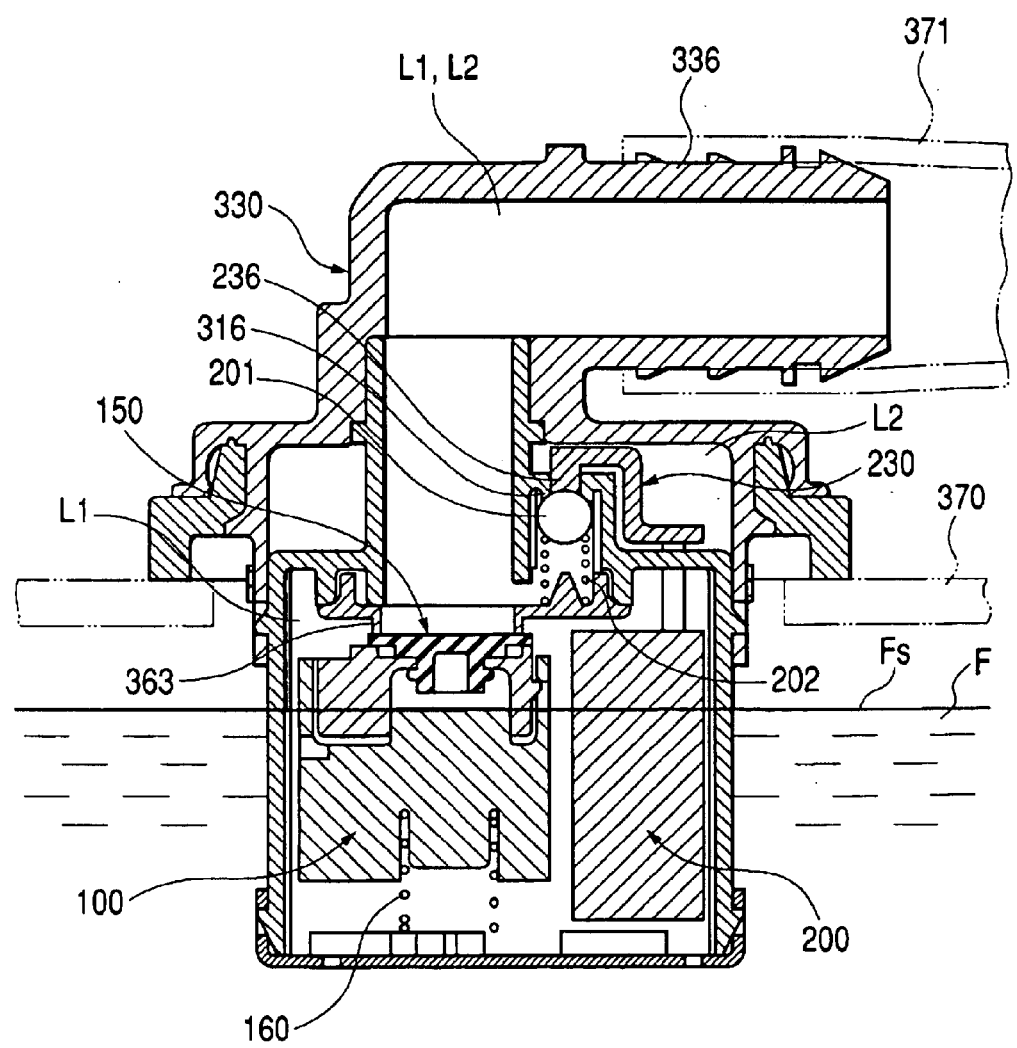
FIG. 14 is a cross-sectional view showing the fuel cut-off apparatus in a state where the liquid level of fuel further rises to close a second passage.

FIG. 14 shows a state where the liquid level Fs of fuel further rises by additional oiling. At this time, the second float 200 also floats, so that the second valve body pressing portion 236 continuing to the overhang portion 230 of the second float 200 rises to force the second valve body 201 to be pressed against the second seal seat 316 due to an urging force of the spring 202. As a result, the opening 314 of the second seal seat 316 is closed, so that the second passage L2 is closed. Therefore, the air pressure within the fuel tank 370 is increased so that the liquid level Fs of fuel F approaches the oil filler port, whereby the operator ends the oiling operation by checking this liquid level visually.

In this condition, if the gasoline is consumed by driving the car, the liquid level of fuel falls again. With the conventional fuel cut-off apparatus, however, if the air pressure within the fuel tank 370 is higher than that of outside, the valve bodies may stick together to impede the valve bodies from being opened, as previously described.

On the contrary, with the fuel cut-off apparatus according to the embodiment of this invention, the air pressure within the fuel tank 370 is exerted through the second passage L2 on the second valve body 201 in an upper to lower direction, namely, in a direction of opening the second valve body 201. Accordingly, if the liquid level Fs of fuel F falls to have no buoyancy act on the second float 200, the second valve body 201 is rapidly separated from the second valve seat 316 to open the second passage L2, because there is absolutely no factor for sticking the second valve body 201 to the second valve seat 316.

As a result, the gas within the fuel tank 370 is flowed out through the second passage L2, so that the air pressure within the fuel tank 370 is decreased, whereby the first valve body 150 contacted with the first seal seat 363 is also separated from the first seal seat 363 to open the first passage L1. Accordingly, it is possible to essentially solve the problem that the valve bodies sticking together due to air pressure within the fuel tank 370 after the end of oiling.

Figure 15A:
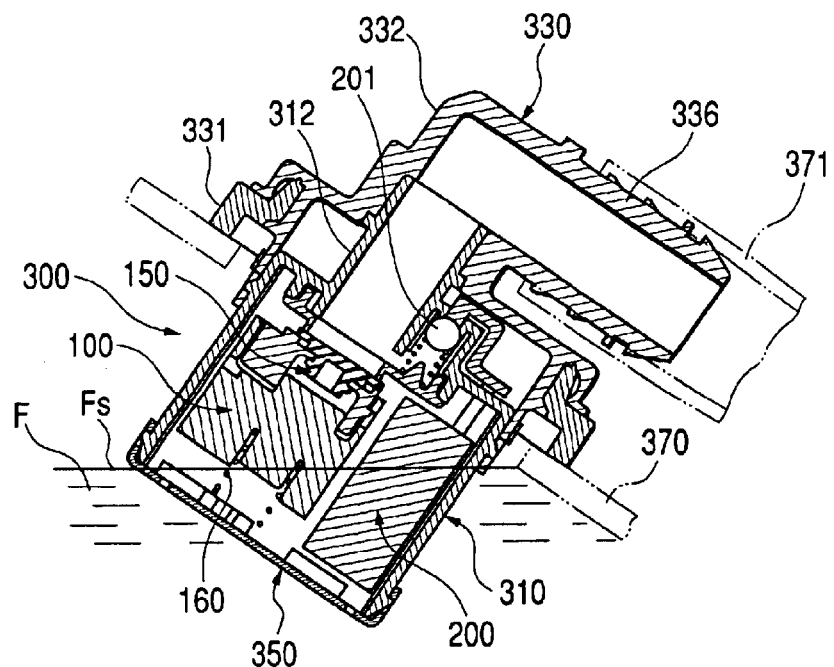
FIG. 15 is a cross-sectional view showing the fuel cut-off apparatus in a state where the car is inclined (A), and in a state where the car is turned over (B).

FIG. 15 shows a state of the fuel cut-off apparatus when the car is inclined or turned over. That is, when the car is inclined as shown in FIG. 15A, the fuel F is entered into the case 300 so that buoyancy acts on the first float valve body 100 and the second float 200 to close the seal seats 363 and 316 corresponding to the first valve body 150 and the second valve body 201 and prevent the fuel F from being flowed out.

Figure 15B:
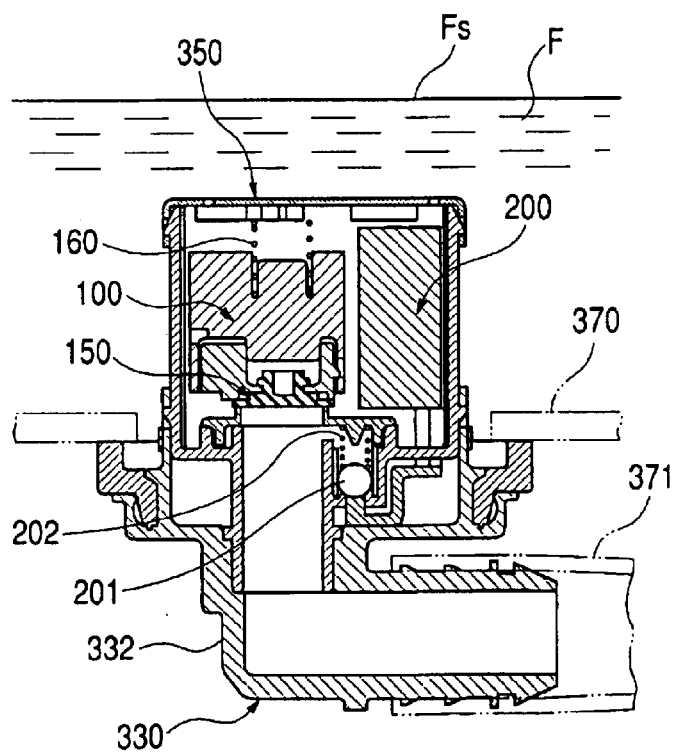

Also, when the car is turned over as shown in FIG. 15B, the first float valve body 100 closes the first seal seat 363 due to its own weight and a urging force of the spring 160, and the second float 200 forces the second valve body pressing portion 236 to be separated from the second valve body 201 due to its own weight, so that the second seal seat 316 is also closed due to a urging force of the spring 202 and own weight of the second valve body 201. Accordingly, it is possible to surely prevent the fuel F from being flowed out and prevent inflammation owing to fuel leakage.

As above described, with this invention, if the liquid level of fuel within the fuel tank reaches a certain height, the first float valve body makes contact with the first seal seat to close the first passage to automatically stop the feed oil gun. However, in this state, the second valve body is opened with an upper end position regulated by the second float, allowing for the additional oiling by operating the feed oil gun. If the liquid level of fuel further rises, the second valve body closes the second seal seat, so that the fuel tank is fully closed to disable the additional oiling and complete the refueling.

Then, if the liquid level of fuel falls, the second float falls to press down the upper end of the second valve body. At this time, when the internal pressure of the fuel tank is high, a force is exerted in a direction for opening the second valve body, so that the second valve body is rapidly opened to enable the second passage to communicate without sticking of the second valve body. If the second valve body is opened, the internal pressure of the fuel tank falls. If the liquid level of fuel further falls, the first valve body is rapidly opened this time to enable the first passage to communicate to the outside. Accordingly, it is possible to securely prevent sticking phenomenon of each valve body when the liquid level of fuel falls.

What is claimed is:

1. A fuel cut-off apparatus for a fuel tank, disposed in a passage for communicating inside of the fuel tank to outside thereof and shutting off the passage when the liquid level of fuel within the fuel tank rises, comprising:
    a case attached to a wall portion of the fuel tank and having a first passage and a second passage for communicating the inside of the fuel tank to the outside thereof;
    a first seal seat disposed in the first passage of the case;
    a first float valve body disposed in the case and closing the first seal seat in response to the liquid level of the fuel when the liquid level rises;
    a second seal seat disposed vertically above the first seal seat, in the second passage of the case;
    a second valve body disposed on one side of the second seal seat communicating to the outside of the second passage, resiliently urged upwards from below; and
    a second float disposed in the case, and regulating an upper end position of the second valve body to open the second valve seat in response to movement of the liquid level of fuel at least until the liquid level is higher than the liquid level at which the first float valve body closes the first seal seat,
    wherein the second valve body closes the second seal seat when the second float does not regulate the upper end position of the second valve body.

2. The fuel cut-off apparatus for fuel tank according to claim 1, wherein the second passage is connected to the first passage at a position vertically below the second seal seat.

3. The fuel cut-off apparatus for fuel tank according to claim 1, wherein:
    the second float includes:
        a second float main body rising as the liquid level of the fuel rises;
        an overhang portion extending upright from the second float main body and overhanging above the second valve body; and
        a second valve body pressing portion extending from the overhang portion to be close to the second float main body and abutting against the second valve body to press down the second valve body.

4. The fuel cut-off apparatus for fuel tank according to claim 3, wherein:
    the case includes:
        a cylindrical case main body receiving the first float valve body and the second float main body, and forming the first passage; and
        an upper body assembled on an upper portion of the case main body to derive the first passage to the outside thereof and forming the second passage between the upper body and the case main body; and
    the overhang portion extends into the second passage through an opening defined at an upper wall of the case main body.

5. The fuel cut-off apparatus for fuel tank according to claim 3, wherein:
    the valve body pressing portion of the second float includes a plurality of ribs projecting from an axial center in outer diameter directions to form a vent path between the ribs;
    lower end faces of the ribs include concave shapes to position the second valve body; and
    at least one of opposed faces of the second float main body and the first float is partially formed with a convex portion for preventing the intimate contact of the first float and the second float main body.

6. The fuel cut-off apparatus for fuel tank according to claim 1, wherein:
    the first seal seat is formed on a partition wall disposed in a case main body; and
    the second valve body and a resilient urging member for urging the second valve body upward from below are sandwiched between the partition wall and an inner wall of the case main body to define the second passage.

7. The fuel cut-off apparatus for fuel tank according to claim 1, wherein:
    the first float valve body includes:
        a first float main body;
        a cap portion assembled via a gap on an upper portion of the first float main body; and
        a first valve body fitted to an opening portion defined in the cap portion.

8. The fuel cut-off apparatus for fuel tank according to claim 7, wherein the gap between the first float main body and the cap portion of the first float valve body communicates to a space defined in the case main body.

9. The fuel cut-off apparatus for fuel tank according to claim 1, wherein:
    a case main body has one internal space having one of approximately columnar shape and approximately prismatic shape; and
    the first float valve body and the second float complement each other to have a shape adaptable to the one internal space.

10. The fuel cut-off apparatus for fuel tank according to claim 9, wherein:
    an overhang portion of the second float has a plurality of leg portions; and
    the leg portions are inserted through a plurality of corresponding openings defined on an upper wall of the case main body into the case main body and connected to a second float main body.

11. A fuel cut-off apparatus for a fuel tank, shutting off a passage when a liquid level of fuel within the fuel tank rises, comprising:

a case having first and second passages for communicating the inside of the fuel tank to the outside thereof;

a first seal seat disposed in the first passage of the case;

a first float valve body that closes the first seal seat in response to the liquid level of the fuel when the liquid level rises;

a second seal seat disposed adjacent the first seal seat, in the second passage of the case;

a second valve body disposed adjacent the second seal seat communicating to the outside of the second passage, resiliently urged upwards from below; and a second float that regulates an upper end position of the second valve body to open the second valve seat in response to movement of the liquid level of fuel at least until the liquid level is higher than the liquid level at which the first float valve body closes the first seal seat.

12. The fuel cut-off apparatus for fuel tank according to claim 11, wherein the second valve body closes the second seal seat when the second float does not regulate the upper end position of the second valve body.

13. The fuel cut-off apparatus for fuel tank according to claim 11, wherein the second passage is connected to the first passage at a position vertically below the second seal seat.

14. The fuel cut-off apparatus for fuel tank according to claim 11, wherein:

the second float includes:
a second float main body rising as the liquid level of the fuel rises;
an overhang portion extending upright from the second float main body and overhanging above the second valve body; and
a second valve body pressing portion extending from the overhang portion to be close to the second float main body and abutting against the second valve body to press down the second valve body.

15. The fuel cut-off apparatus for fuel tank according to claim 14, wherein: the case includes:
a cylindrical case main body receiving the first float valve body and the second float main body, and forming the first passage; and
an upper body assembled on an upper portion of the case main body to derive the first passage to the outside thereof and forming the second passage between the upper body and the case main body; and
the overhang portion extends into the second passage through an opening defined at an upper wall of the case main body.

16. The fuel cut-off apparatus for fuel tank according to claim 14, wherein:

the valve body pressing portion of the second float has a plurality of ribs projecting from an axial center in outer diameter directions to form a vent path between the ribs;

lower end faces of the ribs have concave shapes to position the second valve body; and at least one of opposed faces of the second float main body and the first float is partially formed a convex portion for preventing the intimate contact of the first float and the second float main body.

17. The fuel cut-off apparatus for fuel tank according to claim 11, wherein:

the first seal seat is formed on a partition wall disposed in a main body of the case; and the second valve body and a resilient urging member for urging the second valve body upward from below are sandwiched between the partition wall and an inner wall of the case main body to define the second passage.

18. The fuel cut-off apparatus for fuel tank according to claim 11, wherein:

the first float valve body includes:
a first float main body;
a cap portion assembled via a gap on an upper portion of the first float main body; and
a first valve body fitted to an opening portion defined in the cap portion.

19. The fuel cut-off apparatus for fuel tank according to claim 18, wherein the gap between the first float main body and the cap portion of the first float valve body communicates to a space defined in the case main body.

20. The fuel cut-off apparatus for fuel tank according to claim 11, wherein:

a main case body has one internal space having one of approximately columnar shape and approximately prismatic shape; and the first float valve body and the second float complement each other to have a shape adaptable to the one internal space.

21. The fuel cut-off apparatus for fuel tank according to claim 20, wherein:

an overhang portion of the second float has a plurality of leg portions; and the leg portions are inserted through a plurality of corresponding openings defined on an upper wall of the case main body into the case main body and connected to a second float main body.

* * * * *